United States Patent
Ogunwumi et al.

(10) Patent No.: US 8,349,755 B2
(45) Date of Patent: Jan. 8, 2013

(54) ZEOLITE-BASED HONEYCOMB BODY

(75) Inventors: Steven Bolaji Ogunwumi, Painted Post, NY (US); Patrick David Tepesch, Corning, NY (US); Raja Rao Wusirika, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 261 days.

(21) Appl. No.: 12/793,054

(22) Filed: Jun. 3, 2010

(65) Prior Publication Data

US 2010/0304957 A1 Dec. 2, 2010

Related U.S. Application Data

(62) Division of application No. 12/275,568, filed on Nov. 21, 2008, now Pat. No. 7,754,638.

(60) Provisional application No. 61/004,783, filed on Nov. 30, 2007.

(51) Int. Cl.
 *B01J 29/06* (2006.01)

(52) U.S. Cl. ............ 502/67; 423/700; 502/64; 502/74; 23/313 AS

(58) Field of Classification Search ............ 502/60–78; 423/700; 264/464; 23/313 AS
See application file for complete search history.

(56) References Cited

U.S. PATENT DOCUMENTS

| | | | |
|---|---|---|---|
| 4,862,836 A | 9/1989 | Chen et al. | 123/3 |
| 4,877,514 A * | 10/1989 | Hettinger et al. | 208/120.05 |
| 5,678,165 A | 10/1997 | Wu | |
| 5,776,423 A | 7/1998 | Feeley et al. | 423/239.2 |
| 6,372,033 B1 | 4/2002 | Chalasani et al. | |
| 7,244,409 B2 | 7/2007 | Burgfels et al. | 423/709 |
| 2001/0048971 A1 | 12/2001 | Komarneni et al. | 427/226 |
| 2003/0050181 A1 | 3/2003 | Gibson et al. | 502/64 |
| 2003/0143370 A1 | 7/2003 | Noguchi et al. | 3/12 |
| 2005/0120690 A1 | 6/2005 | Noguchi et al. | 39/6 |
| 2006/0057046 A1 | 3/2006 | Punke et al. | 423/215.5 |
| 2006/0090651 A1 | 5/2006 | Liu et al. | 96/121 |
| 2007/0269352 A1 | 11/2007 | Miyairi et al. | 422/168 |

FOREIGN PATENT DOCUMENTS

| | | | |
|---|---|---|---|
| EP | 0273736 | * | 7/1988 |
| EP | 1 847 320 | | 10/2007 |
| EP | 1 927 392 | | 6/2008 |
| WO | 00/63135 | | 10/2000 |
| WO | 2008/094889 | | 8/2008 |

OTHER PUBLICATIONS

Data Sheet: Dielectric and Alumina Support. SkyWorks. http://www.trans-techinc.com/documents/dielectric_alumina_supports.pdf Accessed Jul. 16, 2009.

* cited by examiner

*Primary Examiner* — Stuart Hendrickson
*Assistant Examiner* — Richard M Rump
(74) *Attorney, Agent, or Firm* — Matthew J. Mason

(57) ABSTRACT

Zeolite-based honeycomb bodies and methods of manufacturing same. Zeolite-based honeycomb bodies especially suited for engine exhaust treatment applications include a primary phase comprising a zeolite having a SiO2 to Al2O3 molar ratio in the range from 5 to 300. The zeolite-based composites are porous with an open porosity of at least 25% and a median pore diameter of at least 1 micron. The zeolite-based honeycomb bodies can be manufactured by an extrusion method.

8 Claims, 3 Drawing Sheets

ZEOLITE-BASED HONEYCOMB BODY

RELATED APPLICATIONS

This application is a divisional application of U.S. application Ser. No. 12/275,568, filed on Nov. 21, 2008, now U.S. Pat. No. 7,754,638 which claims the benefit of priority to U.S. Provisional Application No. 61/004,783, filed Nov. 30, 2007, entitled "Zeolite-Based Honeycomb Body."

FIELD

The present invention relates generally to zeolite-based honeycomb bodies, such as for use in engine exhaust systems.

BACKGROUND

Various methods and devices are known for reducing emissions of engine exhaust, including catalyst supports, or substrates, and filters.

SUMMARY

The present disclosure relates to zeolite-based honeycomb bodies and their manufacture. The zeolite-based honeycomb bodies are particularly useful in applications of engine exhaust filtration, and more particularly to high porosity filters for engine exhaust systems, particularly diesel exhaust systems. The honeycomb bodies exhibit a high surface area, high porosity, or sufficient strength for catalytic applications, or combinations thereof, and preferably a combination of all, while also reducing or eliminating the need for washcoating a high volume of catalyst onto a support. In embodiments, an extruded zeolite-based honeycomb body is provided having one or more improved properties of porosity, thermal and mechanical properties, particularly under conditions encountered in diesel exhaust system use and manufacture.

In one aspect, an extruded zeolite-based honeycomb body is provided in accordance with the present disclosure comprising a primary phase material comprising a zeolite having a SiO2 to Al2O3 molar ratio in the range from 5 to 300, wherein the honeycomb body exhibits a median pore diameter of at least 1 micron, preferably at least 3 microns and more preferably at least 5 microns.

In another aspect, an extruded zeolite-based honeycomb body is provided in accordance with the present disclosure comprising a primary phase material comprising a zeolite having a SiO2 to Al2O3 molar ratio in the range from 5 to 300, and preferably further comprises at least one secondary phase material having a coefficient of thermal expansion of at least $10 \times 10^{-7}/°$ C., wherein the honeycomb body exhibits a median pore diameter measured by mercury intrusion of at least 1 micron, i.e. 1 micron or greater. Preferably, the secondary phase material is selected from the group consisting of alumina, zircon, zirconia, cordierite, titania, silica, ceria and other oxides of rare earth metals.

In another aspect, an extruded zeolite-based honeycomb body exhibiting a coefficient of thermal expansion of zero to $+/-15 \times 10^{-7}/°$ C., preferably zero to $+/-10 \times 10^{-7}/°$ C. over the temperature range from 25° C. to 800° C., a porosity in the range of about 30-70% and a median pore size of at least 1 micron is provided, i.e. 1 micron or greater, said honeycomb body being formed from a mixture comprising a primary phase material comprising a zeolite having a $SiO_2$ to $Al_2O_3$ molar ratio in the range from 5 to 300; a secondary phase material having a coefficient of thermal expansion greater than $10 \times 10^{-7}/°$ C.; a binder, and 1 to 85% by weight superaddition of a poreformer agent.

In another aspect, an extruded zeolite-based honeycomb body is provided exhibiting a surface area in the range of 20 $m^2/g$ to about 300 $m^2/g$, preferably exhibiting a surface area of greater than about 100 $m^2/g$, more preferably greater than about 200 $m^2/g$; an open porosity of at least 25%, preferably between 30% and 70%; and a median pore diameter of at least 1 micron is provided, i.e. 1 micron or greater. In some embodiments, the median pore diameter is in the range of 1 to 25 microns; in other embodiments the median pore diameter is at least 3 microns; in other embodiments at least 5 microns; in other embodiments at least 10 microns; and in other embodiments in a range of about 3-20 microns.

In some embodiments, the extruded zeolite-based honeycomb bodies of the present disclosure also exhibit a low coefficient of thermal expansion of zero to $+/-15 \times 10^{-7}/°$ C., preferably zero to $+/-10 \times 10^{-7}/°$ C., over the temperature range from 25° C. to 800° C., and may further exhibit a modulus of rupture, as measured by the four-point method on a cellular bar of rectangular cross-section cut parallel to the direction of the channels, of at least about 200 pounds per square inch (psi), preferably of at least 300 psi, more preferably 600 psi, and more preferably at least 900 psi.

In another aspect, the present disclosure is directed to a method of manufacturing a zeolite-based honeycomb body having a median pore size greater than 1 micron comprising the steps of (a) forming a mixture comprising a zeolite source material having a $SiO_2$ to $Al_2O_3$ molar ratio in the range from 5 to 300; optionally a secondary phase source material having a coefficient of thermal expansion greater than $10 \times 10^{-7}/°$ C.; a binder and 1-85% superaddition of a poreformer agent; (b) extruding the mixture to form a cellular body; and (c) heating the cellular body to produce a zeolite-based honeycomb body. In some embodiments, the method includes first providing a batch slurry mixture comprised of source materials for the primary phase zeolite component and optionally a secondary phase material; spray-drying the slurry mixture to form generally uniformly sized spray-dried agglomerates with a more uniform particle size distribution (where here the "particle size" refers to the size of the agglomerates); forming a batch extrusion mixture from the spray-dried agglomerate; extruding the batch extrusion mixture to form a cellular body; and heating the cellular body to form a zeolite-based honeycomb body.

In some embodiments, the extruded zeolite-based honeycomb bodies provided in accordance with the present disclosure are especially suitable in applications for treating diesel and lean burn engine exhaust.

Additional features and advantages of the present disclosure will be set forth in the detailed description which follows, and in part will be readily apparent to those skilled in the art from that description or recognized by practicing the subject matter as described herein, including the detailed description which follows, the claims, as well as the appended drawings.

It is to be understood that both the foregoing general description and the following detailed description present particular embodiments, and are intended to provide an overview or framework for understanding the nature and character of the inventions as claimed. The accompanying drawings are included to provide a further understanding of the disclosure, and are incorporated into and constitute a part of the specification. The figures illustrate various embodiments and aspects of the disclosure, and together with the description serve to explain the principles and operations of the claimed invention.

DETAILED DESCRIPTION

Figure 1:
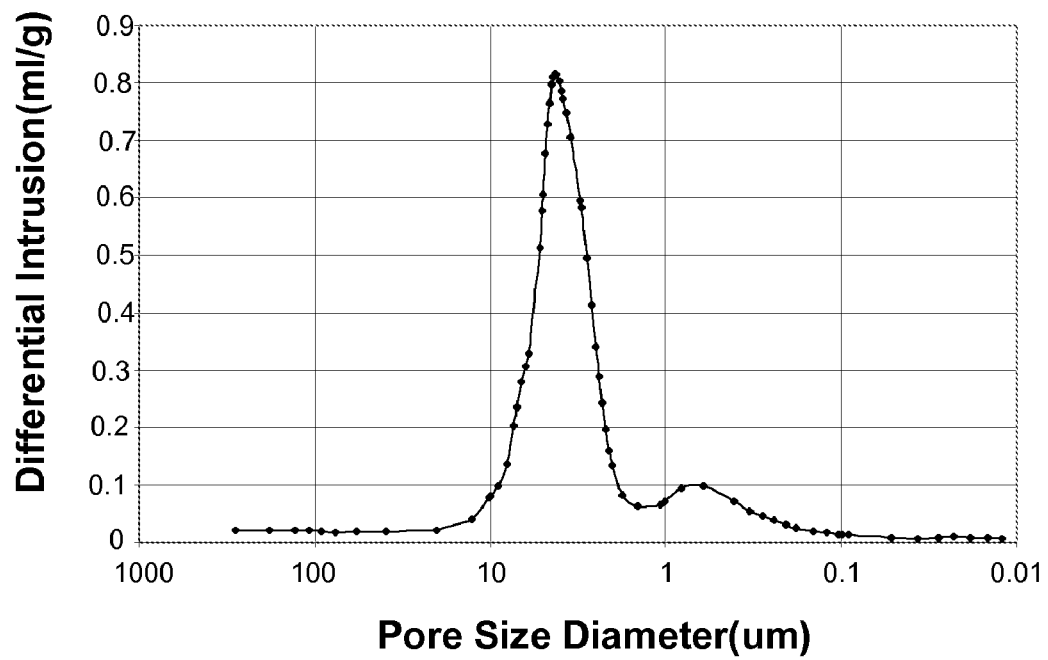
FIG. 1 is a graphic illustration of the pore size distribution (log differential intrusion of ml/g vs. pore size in units of microns) for a zeolite/alumina body formed from a batch with 10% green bean starch superaddition.

Reference will now be made in detail to the embodiments of the disclosure, examples and aspects of which are illustrated in the accompanying drawings.

The values $d_{10}$ and $d_{50}$ are defined as the pore diameters at 10% and 50% of the cumulative pore size distribution based upon volume, as measured by mercury porosimetry, with $d_{10}<d_{50}$. Thus, $d_{50}$ is the median pore diameter, and $d_{10}$ is the pore diameter at which 10% of the pores are finer, based upon volume. The value of $d_{90}$ is the pore diameter for which 90% of the pores, by volume, are finer in diameter; thus $d_{10}<d_{50}<d_{90}$. The value $d_F$ is defined as $(d_{50}-d_{10})/d_{50}$. The value $d_B$ is defined as $(d_{90}-d_{10})/d_{50}$. Unless otherwise noted herein, particle size measurements herein were made with a Microtrac Inc. particle size analyzer device.

One aspect of the present disclosure is directed to extruded zeolite-based honeycomb bodies. Embodiments of the extruded zeolite-based honeycomb bodies of the present disclosure can be particularly suited for use as flow through substrates or as exhaust filters such as in diesel exhaust and lean burn exhaust systems. The honeycomb bodies of the present disclosure preferably exhibit high surface area and low thermal expansion, and in some embodiments reduce or eliminate the need for excessive high surface area washcoating. Filters described are referred to as "wall flow" filters because the flow paths resulting from channel plugging require the exhaust being treated to flow through the porous cell walls prior to exiting the filter. Embodiments of the zeolite-based honeycomb bodies disclosed herein preferably exhibit thermal stability at temperatures up to at least 800° C. such that the components of the microstructure do not substantially change in composition or physical structure.

Honeycomb bodies provided in accordance with the present disclosure comprise a ceramic honeycomb body comprising a primary phase comprising one or more zeolite components. Exemplary zeolites for inclusion in an extrudable batch include ZSM-5, Beta, Mordenite, Y-zeolite, Ultrastable-Y and aluminum phosphate zeolites, and mixtures thereof. One source of ZSM-5 zeolite is supplied by Zeolyst International of Valley Forge, Pa. The zeolite material preferably has a $SiO_2$ to $Al_2O_3$ molar ratio in the range from about 5 to about 300, more preferably about 25 to about 60. The primary phase zeolite, or mixture of zeolites, preferably have a mean particle size in the range of about 10 to about 100 microns. The primary phase material may comprise about 35% to about 80% (volume percent) of the fired zeolite-based composite filter body composition. Material for use in formulating the primary phase material useful in producing the extruded zeolite-based bodies of the present disclosure may be selected from any suitable source.

In some embodiments, the walls of the honeycomb body disclosed herein may advantageously incorporate an active catalyst (such as one or more combinations of metals from the transition metals, alkali and alkaline earth metals or the lanthanides) dispersed throughout (i.e. within) the wall for controlling emissions components. The catalyst(s) (e.g. metal cations) may be impregnated in the zeolite materials by the zeolite supplier or manufacturer; such pre-impregnated powders can then be mixed into an extrusion batch. In other embodiments, the catalyst(s) may be loaded into the zeolite by mixing the catalyst(s) into an extrusion batch comprising a zeolite, or the catalyst(s) may be loaded into the zeolite by mixing the catalyst(s) into a slurry comprising a zeolite, wherein the slurry is spray-dried to form agglomerates. Thus, the catalyst(s) can be integrated into the honeycomb bodies by impregnating pre-extrusion zeolite material in the extrusion batch formulation and/or during spray-drying. At the time of batch formulation and extrusion, catalyst(s) can readily be incorporated in the zeolite powders to produce an extruded body with added catalyst functionality. Advantageously, the catalyst materials may be integrated into the extruded body, thereby reducing the need for additional high surface area washcoat treatments. In some embodiments, the integrated catalyst functionality can reduce the need to use washcoat treatments for the catalyst application and thereby can simplify the processing of the composite bodies, potentially reducing manufacturing cost and time. In some embodiments, the integrated catalyst functionality can thus lessen a washcoat treatment requirement, and may also lower back-pressures when compared to known filter bodies which require thick washcoat treatments. However, in some embodiments, an additional catalyst washcoat treatment may also be subsequently applied to the extruded body to impart desired enhanced performance.

Active metal catalyst(s) can be selected from the group consisting of $Fe^{+2}$, $Cu^{+2}$, $W^{+2}$, $Co^{+2}$, $Mn^{+2}$, $Ag^{+1}$, $Zr^{+1}$, $Mo^{+2}$, $Rh^{+2}$, $Ni^{+2}$, $Pt^{+2}$, $La^{+2}$, and $Ce^{+2}$, and combinations thereof. Derivatives of the metal salts, nitrates, acetate and carbonate may be used for the exchange process. In some embodiments, the iron cation is introduced as $Fe^{+2}$ from the precursor to increase the effectiveness of the exchange process. Ferrous ammonium sulphate is an exemplary $Fe^{+2}$ source that may be used to produce high SCR activity. Thus, pre-exchanged or impregnated powders may be used. In some embodiments, the active metal(s) do not exceed 10% by weight, based on the total weight of the finished honeycomb body. In some embodiments, the catalyst(s) loading is in the range of about 1 to about 6% by weight. When the honeycomb body is deployed in an SCR application, preferably each of the one or more metal(s) is deposited in the zeolite pores, as excess metal(s) on the surface may degrade the SCR activity. In some embodiments, one or more alkali (potassium, lithium, sodium and cesium) and alkaline (barium, calcium) earth metals may be incorporated in the extrusion composition to provide a honeycomb body having an active NOx adsorber capability. Without being held to any particular theory, it is expected that the issue of alkali metal migration is not as far-reaching as encountered with known washcoats on a ceramic substrate, such as cordierite substrate, if the alkali or alkaline earth metals are substantially disposed within the zeolite pores.

In another aspect, the extruded zeolite-based honeycomb bodies of the present disclosure preferably further include at least one secondary phase material selected from a material having a coefficient of thermal expansion of at least $10 \times 10^{-7}/°$ C., The secondary phase material is preferably thermally stable at temperatures up to at least 800° C., preferably at least 1000° C. such that the honeycomb body does not substantially change in composition and physical structure. The secondary phase materials may include those materials that further exhibit high surface area greater than 20 m²/g, preferably greater than 100 m²/g, and more preferably greater than 200 m²/g. The secondary phase materials are preferably selected from alumina, zircon, zirconia, silica, cordierite titania, ceria and other oxides of rare earth metals, and combinations and mixtures thereof. In some embodiments, the secondary phase has a mean particle size comparable to the mean particle size of the primary phase, and is preferably in the range of up to 100 microns, preferably greater than 10 microns. The secondary phase material has a positive coefficient of thermal expansion which balances the negative coefficient of thermal expansion of the primary phase zeolite material. The secondary phase material may be present in the fired ceramic body in a range of 0 to 50% (volume). In some embodiments, the secondary phase material comprises between 10 and 45% of the fired ceramic body.

In another aspect, the zeolite-based honeycomb bodies also incorporate a binder component. In a further aspect of the disclosure, the secondary phase material and binder material may be the same material. The permanent binder assists in providing permanent bonding strength between the primary and secondary phase particles. Suitable binder materials include silica or silica forming materials, as well as colloidal materials providing sources of alumina, cordierite, ceria and zirconia, and mixtures thereof. The colloidal materials generally may have mean particle sizes of less than 100 nm. Mixtures or combinations of binder materials may also be used. The binder is preferably selected form silicone binding agents such as silicone resins and/or emulsions. These can be provided as precursors, for example, silica precursors such as silicone resin, or colloidal silica are suitable. Preferably, the binder is incorporated in the form of a silicone resin or silicone emulsion. Silicone resins can be added to the mixture in the form of an aqueous emulsion, and are commercially available, such as Wacker AG SILRES® M 50 E (an emulsion of a methyl silicone resin with reported solids content of 52-55%) or Wacker AG SILRES® M 97 E, both available form Wacker-Chemie GmbH of Munich, Germany. In some embodiments, the binder is incorporated in the batch mixtures such that the fired ceramic contains silica binder in an amount ranging from about 5 to about 30% by weight, preferably 15-30%, and more preferably about 20%. The amounts of the binders are based on the expected weight after heat-treatment which will be the weight of the binder in the product body. For example when silicone resins are used, the weight of the binder in the product is the weight of silica added via the resins.

Advantageously, the walls of the zeolite-based honeycomb bodies of the present disclosure have a high porosity after firing of not less than 25% and preferably in the range of about 30-70% and a mean pore size of at least 1 micron. In some embodiments, the median pore diameter is at least 3 microns, more preferably at least 5 microns and is most preferably in the range of about 3 to about 20 microns. In some embodiments, the median pore diameter is at least 10 microns or more, and can be selected to be in the range of about 5 to 25 microns. The porosity and median pore diameter can be controlled by incorporating a poreformer into the batch mixture prior to extrusion, as well as utilizing larger inorganic particle components. In another aspect, the percentage of pores having a diameter greater than 5 microns is at least 10%, preferably at least 20%, more preferably at least 30% and even more preferably at least 40%. The poreformer may be selected from graphite, starches, including green bean starch, potato starch, rice hulls, foams, and mixtures thereof. The poreformer is preferably selected from poreformer particles having a size in the range of about 10 to about 70 microns, and more preferably 20 to 50 microns. The poreformer is incorporated in the pre-extruded batch mixture in an amount ranging from about 1 to about 85% by superaddition, more preferably in the range of about 10 to about 60%. In some embodiments, the poreformer agent is present in the green honeycomb body in a range from 10% to 40% by weight superaddition. The poreformer in the mixture is calculated as a superaddition over the combined weights of primary phase material, secondary phase material and binder (based on as-heated yield) according to the following formula: (wt. poreformer/wt. of primary phase material+secondary phase material+binder)×100

Embodiments of the disclosed structures exhibit advantageous open porosity, median pore sizes, permeability and mean coefficients of thermal expansion. Exhaust filtration embodiments can have a porosity of at least 30-70%, and a median pore diameter as measured by mercury intrusion of at least 1 micron, preferably at least 3 microns, more preferably at least 5 microns and preferably in a range of about 3-20 microns. The porosity and median pore diameter can be controlled by controlling the size of the inorganic particle precursors, as well as the size and amount of selected poreformers. The primary phase zeolite materials include micropores that form microchannels through the zeolite particles. The microporosity and microchannels of the zeolite materials add further connectivity between adjacent honeycomb channels that are believed to lead to lower system backpressure in filter applications.

In some embodiments, the zeolite-based honeycomb bodies exhibit a high surface area in the range of 20 m²/g to about 300 m²/g, preferably exhibiting a surface area of greater than about 100 m²/g, and an open porosity of at least 30%, preferably between 30% and 70%. The high porosity and median pore diameter, as well as the high surface area, allow for catalyst integration and thereby reduces need for excessive washcoating, which may lead to a lower pressure drop in the zeolite-based honeycomb bodies of the present disclosure.

In another aspect, the disclosed zeolite-based honeycomb bodies also exhibit a mean coefficient of thermal expansion from 25-800° C. in the range of about 0 to $+/-15 \times 10^{-7}/°$ C., preferably $+/-10 \times 10^{-7}/°$ C., and a modulus of rupture as measured on a cellular bar of at least about 200 pounds per square inch (psi), preferably at least about 300 psi, more preferably at least about 600 psi, and more preferably at least about 900 psi. For zeolites to be used as monolithic honeycombs and used at high temperatures (>300° C.), these materials need to have sufficient thermal shock resistance. Thermal shock resistance depends on the coefficient of thermal expansion. The closer the coefficient of thermal expansion is to zero, the more thermally shock resistant is the material. Zeolites have low or negative thermal expansions, that is, a coefficient of thermal expansion (CTE) of $-20 \times 10^{-7}/°$ C. or even lower over their useful stable temperature ranges. The secondary phase component preferentially has a higher thermal expansion than the zeolite-based primary phase components, preferably exhibiting a positive CTE value. The secondary phase component raises the thermal expansion of the primary phase zeolite or zeolite mixtures over the useful stable temperature ranges. The primary and secondary phase combinations of the present disclosure and the products produced therefrom therefore have coefficients of thermal expansion (CTE's) which are higher than the CTE's of the zeolite materials without the secondary phase component. Advantageously, embodiments of zeolite-based honeycomb bodies described herein include a secondary phase material having a positive thermal expansion coefficient that balances the negative coefficient of the primary phase. Thus, embodiments of the present disclosure provide thermally shock resistant zeolite-based honeycomb bodies and methods of making them.

The general method of producing porous honeycomb bodies comprises mixing batch materials, blending the mixture, forming a green body, and subsequently sintering the green body to a hard porous structure. A batch mixture suitable for extrusion can be prepared by mixing the dry batch with a suitable liquid vehicle. The vehicle may comprise water and extrusion aids necessary to give the batch plastic formability and sufficient green strength after forming to resist breakage prior to firing. Preferably, the amounts of primary phase material and secondary phase material in the mixture will be essentially the same as the amounts in the product body; in some embodiments, the mixture is made up in parts by weight based on the desired final ceramic body: from 20 to about 80% of primary phase zeolite material, up to about 60% of the secondary phase material, and about 10 to 50% of the permanent binder (based on the expected weight after heat treatment). These amounts are substantially the same as the levels in the finished honeycomb bodies. Various lubricants, binders, surfactants, pore-formers and viscosity modifiers are added to the batch during the mixing step to provide viscosity control, plasticity and strength prior to firing, and porosity to the fired structure.

In some embodiments, a method of manufacturing the zeolite-based honeycomb body includes the steps wherein the primary phase material, and preferably a secondary phase material is mixed in a liquid vehicle to form a slurry. Thereafter, the slurry is spray-dried, or similar techniques are used, to form agglomerates comprised of the initial material(s) as an additional process step to mix the materials, increase the particle size (i.e. agglomerated particle, or agglomerate, size) and obtain a more uniform size distribution of the agglomerates prior to extrusion and firing. The spray-drying forms agglomerates of the spray-dried components, preferably including the primary phase zeolite, secondary phase material and permanent binder. The agglomerates can be heated to form calcined agglomerates or the agglomerates can be used directly after spray-drying, which may then be used in forming an extrusion batch mixture.

A method of making a honeycomb body is disclosed herein, the method includes mixing zeolite source material as herein described with a permanent binder source material and forming zeolite agglomerates from the mixture. The agglomerates may further include a secondary phase source material. The agglomerates may also be calcined prior to subsequent use. The zeolite agglomerates are then mixed with a pore former or mixture of pore formers and a temporary binder to form an extrudable mixture. The extrudable mixture is extruded to form a honeycomb body comprised of a plurality of walls defining channels. The honeycomb body is then heated to produce a honeycomb body having a primary phase zeolite material homogenously distributed therein, a median pore diameter greater than 1.0 micron and a porosity greater than 25% in the walls. A portion of the channels may be plugged, for example by known plugging methods, to form a wall-flow filter. In another aspect, a secondary phase source material may be mixed with the zeolite agglomerates and permanent binder source material to form the extrudable mixture and then further processed as outlined above to form a honeycomb body having a primary phase zeolite material and a secondary phase material homogenously distributed therein, a median pore diameter greater than 1.0 micron and a porosity greater than 25% in the walls.

In some method embodiments, a primary phase zeolite source material, a secondary phase source material and binder are mixed into slurry and subsequently spray-dried together to increase the mean particle size of the resultant spray-dried agglomerate above the mean particle size of the combined constituent materials. In some embodiments, the mean particle size of the spray-dried agglomerate is at least 10 microns, and preferably in the range of 10 to 100 microns, more preferably in the range of 20-50 microns, and in some embodiments in the range of 25-45 microns. The agglomerates of the spray-drying may be calcined. The agglomerates are combined with suitable amounts of permanent binder, poreformer, organic paste and processing aids and formed into desired structures, such as a honeycomb structures, by extrusion. The spray-drying advantageously provides larger inorganic particles that may provide increases in porosity and median pore diameter of the resultant ceramic body.

The extrusion aids can comprise binders and plasticizers/paste formers, as well as processing aids such as lubricants. The organic paste provides plasticity during forming, and some strength to the extruded body prior to firing. Organic pastes suitable for the purposes set forth herein include cellulose ether type materials and/or their derivatives. Sources of cellulose ethers and/or derivatives thereof include the Methocel™ line of cellulose ethers, from Dow Chemical Co., and mixtures thereof. Methylcellulose is an example of an organic paste forming agent suitable for use in formulating the filter bodies of the present disclosure. The organic paste and other processing aids can be added as a super addition over the combined weight of the primary phase, secondary phase and binder (based on expected weight after heat treatment). The super addition of organic paste can be in the range of about 3-8%, but more or less may be utilized. The organic paste or temporary binder material is substantially burned off during the subsequent firing of the honeycomb body. Water may be added to the batch components to achieve the necessary plasticity for handling and extrusion. Water-based binders can be used for ease of processing in this regard. The mixtures preferably also contain superaddition of a poreformer or mixtures thereof, as described above, to assist in controlling the porosity and mean pore size of the fired product.

In one illustrative embodiment, a primary phase is selected as ZSM-5 zeolite having an $SiO_2$ to $Al_2O_3$ ratio of 55 to 1. The median particle size of the zeolite is approximately 10 microns. A secondary phase material is selected as calcined A16 α-alumina having a median particle size of less than 1 micron. The primary phase and secondary phase materials were prepared in slurry form comprising approximately 28.9% (mass) zeolite, approximately 12.4% α-alumina and approximately 17.3% of a silicon resin emulsion and approximately 16.1% ethylene acrylic acid emulsion in water. The slurry was spray-dried and the resulting agglomerates were calcined to 850° C. The median particle size of the resulting spray-dried and calcined agglomerate was approximately 26.2 microns. The calcined agglomerates are further mixed with suitable amounts of binder, paste, poreformer, water and processing aids to form an extrudable composition and extruded.

One method of forming honeycomb bodies is by extrusion through a forming die. A ram extruder, continuous auger, or twin screw extruder or other known extrusion apparatus can be used. The honeycomb body according to the present disclosure can have any convenient size and shape, for example, a right circular cylindrical shape structure. The honeycomb body can be extruded to form a matrix of walls wherein the primary phase material(s), secondary phase material(s) (if present) and permanent binder are homogenously distributed throughout the walls. The matrix of walls define channels extending through the honeycomb body. The honeycomb body can be further coated with a skin material at the outer periphery of the structure as is known in the art.

The firing procedure can be achieved with known ovens, such as periodic (or batchwise) ovens, or kilns, such as tunnel kilns that employ one or more conveyors. In some embodiments, the green structures are fired by exposing the green structures to a heated gaseous environment, such as air, wherein the air is heated to temperatures in the range of about 400° C.-1200° C., and in some of these embodiments between about 600° C.-900° C., with a residence time in that temperature range of a duration sufficient to complete firing of the body. The residence time can be about 1 to 10 hours, and in some embodiments from 3 to 6 hours, and may depend, for example, on the type or source of components employed.

In some of embodiments, the honeycomb body is a flow through substrate. In some embodiments, the honeycomb body is a wall flow filter, such as a particulate filter, for example a diesel particulate filter. In filter embodiments, at least a portion of the channels or cells are plugged so as to seal the respective cell channels in the so-formed zeolite-based honeycomb body. For example, in some embodiments a portion of the inlet end cell channels are plugged and a portion of the outlet end cell channels are plugged but not corresponding to those at the inlet end, such that each cell is plugged at one end only. Plugging at the ends of the cell channels is preferably accomplished with plugs having a depth less than about 20 mm, and in some embodiments about 5 to 20 mm. In some embodiments, the plugging arrangement is to have every other cell channel on a given end plugged in a checkered pattern.

The disclosure may be further understood by reference to the following Examples, which are intended to be merely illustrative of the presently preferred compositions and method for carrying out the invention.

EXAMPLE 1

Preparing Zeolite-Based Agglomerates

Zeolite agglomerates were prepared by forming a slurry composition as outlined in Table 1 below. Optional calcining was performed on slurries of Batches 1 and 2 to form an agglomerate having the final composition and properties outlined in Table 2, where particle size refers to the size of agglomerates. All percentages are mass % based on the total mass of the composition.

TABLE 1

|  | Batch 1 Slurry | Batch 2 Slurry | Batch 3 Slurry |
| --- | --- | --- | --- |
| ZSM-5 | 28.9% | 16.9% | 16.2% |
| A16SG alumina | 12.4% | — | — |
| Cordierite | — | 24.4% | 23.3% |

TABLE 1-continued

|  | Batch 1 Slurry | Batch 2 Slurry | Batch 3 Slurry |
| --- | --- | --- | --- |
| (500 mesh) |  |  |  |
| Silicone resin* | 17.3% | 17.3% | — |
| Colloidal silica** | — | — | 57.7% |
| EAA emulsion*** | 16.1% | 16.1% | — |
| DI**** | 25.3% | 25.2% | 2.9% |

*= silicone resin emulsion (Wacker Silres M50E)
**= Ludox ® SK-B colloidal silica
***= ethylene acrylic acid emulsion
****= deionized water. Additional water may be added as necessary for slurry viscosity control.

TABLE 2

|  | Batch 1 Agglomerate | Batch 2 Agglomerate | Batch 3 Agglomerate |
| --- | --- | --- | --- |
| ZSM-5 | 59.5% | 34.9% | 30.0% |
| A16SG alumina | 25.5% | — | — |
| Cordierite (500 mesh) | — | 50.2% | 43.2% |
| Silica binder | 15.0% | 15.0% | 26.8% |
| Median Particle Size (microns) | 26.2 | 34.4 | 46 |
| 10% < than* (microns) | 8.7 | 16.6 | 22 |
| 90% < than** (microns) | 47.1 | 85.2 | 115 |

*= 10% of particles fell below
**= 90% of particles fell below

The Batch 1 and Batch 2 slurries were calcined to 850° C. after spray-drying, while Batch 3 was not calcined. The Batch 3 spray-dried agglomerate was subsequently screened to remove particles above 500 mesh and below 60 mesh. Particle size data for Batch 3 in Table 2 is after screening.

EXAMPLE 2

Preparing Extruded Zeolite-Based Honeycomb Bodies

Extruded zeolite-based honeycomb bodies were prepared from the zeolite-based agglomerate batches of Example 1 to form the extrusion batch compositions outlined in Table 3. All percentages are mass %. More or less water may be added to the extrusion batch formulations as necessary for rheology control. The resulting extrusion batch compositions were extruded into honeycomb cellular bodies having about 200 cells per square inch, and having a wall thickness of about 16 mils.

The extruded cellular bodies were next dried and then fired in air to maximum oven temperatures of 850° C. and held there for approximately 3 hours to form the final product structure. The structures were then evaluated for physical properties. Percent porosity, and median pore diameters were determined by mercury porosimetry. The measured properties of the extruded zeolite-based honeycomb bodies of Table 3 are provided in Table 4.

TABLE 3

| | Extrusion Batch | | | | |
|---|---|---|---|---|---|
| | 1 | 2 | 3 | 4 | 5 |
| Batch 1 Agglomerate | 54.4% | 46.0% | — | — | — |
| Batch 2 Agglomerate | — | — | 40.0% | 46.1% | — |
| Batch 3 Agglomerate | — | — | — | — | 46.1% |
| methylcellulose | 4.2% | 4.2% | 2.8% | 3.2% | 3.2% |
| Silicone resin emulsion | 36.0% | 36.0% | 24.1% | 27.7% | 27.7% |
| Green-bean starch | 5.4% | 13.8% | — | — | — |
| A625 graphite | — | — | 33.2% | — | — |
| potato starch | — | — | — | 23.0% | 23.0% |

TABLE 4

| | Extrusion Batch | | | | |
|---|---|---|---|---|---|
| | 1 | 2 | 3 | 4 | 5 |
| Fired Body Composition | | | | | |
| ZSM-5 | 46.6% | 44.8% | 27.8% | 27.8% | 24.0% |
| Alumina | 20.0% | 19.2% | — | — | — |
| Cordierite | — | — | 40.0% | 40.0% | 34.5% |
| Silica binder | 33.5% | 36.0% | 32.1% | 32.1% | 41.5% |
| Porosity Data (Hg-intrusion) | | | | | |
| Porosity | 43.1% | 48.4% | 69.6% | 54.6% | 54.4% |
| Median pore diameter, $d_{50}$ (microns) | 3.7 | 4.7 | 3.1 | 13.1 | 18 |
| $d_{10}$ | 0.58 | 1.37 | 1.03 | 1.56 | 1.19 |
| $d_{90}$ | 8.51 | 9.03 | 55.32 | 30.27 | 23.39 |
| $d_F$ | 0.84 | 0.71 | 0.67 | 0.88 | 0.93 |
| $d_B$ | 2.14 | 1.63 | 17.51 | 2.19 | 1.23 |
| Porosity over 5 microns | 11% | 22% | 31.0% | 42% | 44% |

Figure 2:
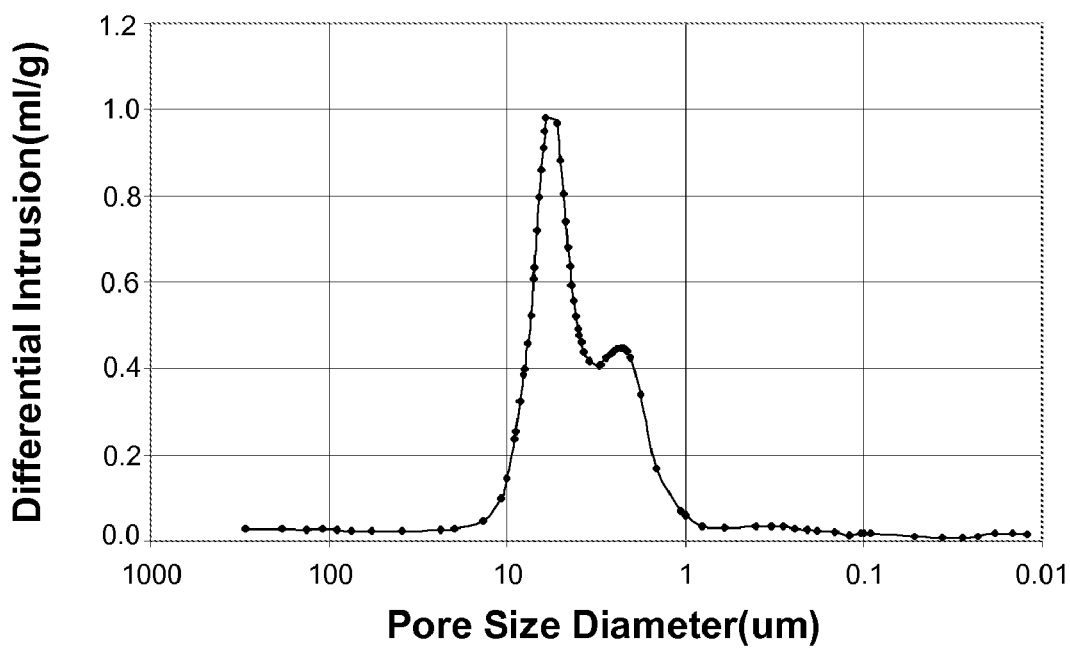
FIG. 2 is a graphic illustration of the pore size distribution (log differential intrusion of ml/g vs. pore size in units of microns) for a zeolite/alumina body formed from a batch with 30% green-bean starch superaddition.
Figure 3:
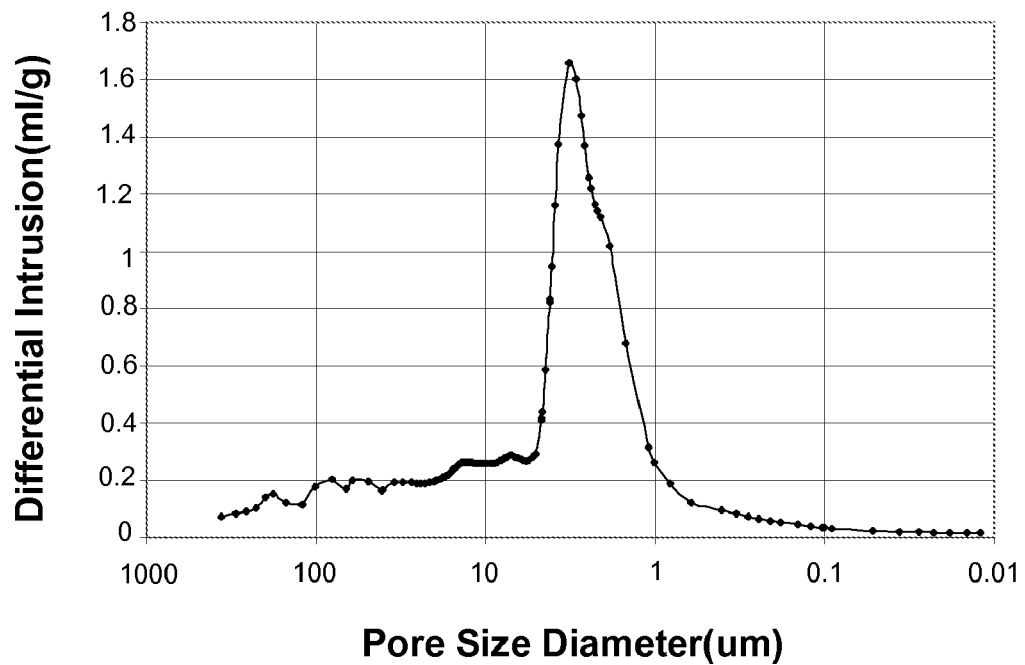
FIG. 3 is a graphic illustration of the pore size distribution (log differential intrusion of ml/g vs. pore size in units of microns) for a zeolite/cordierite body formed from a batch with 83% graphite superaddition.
Figure 4:
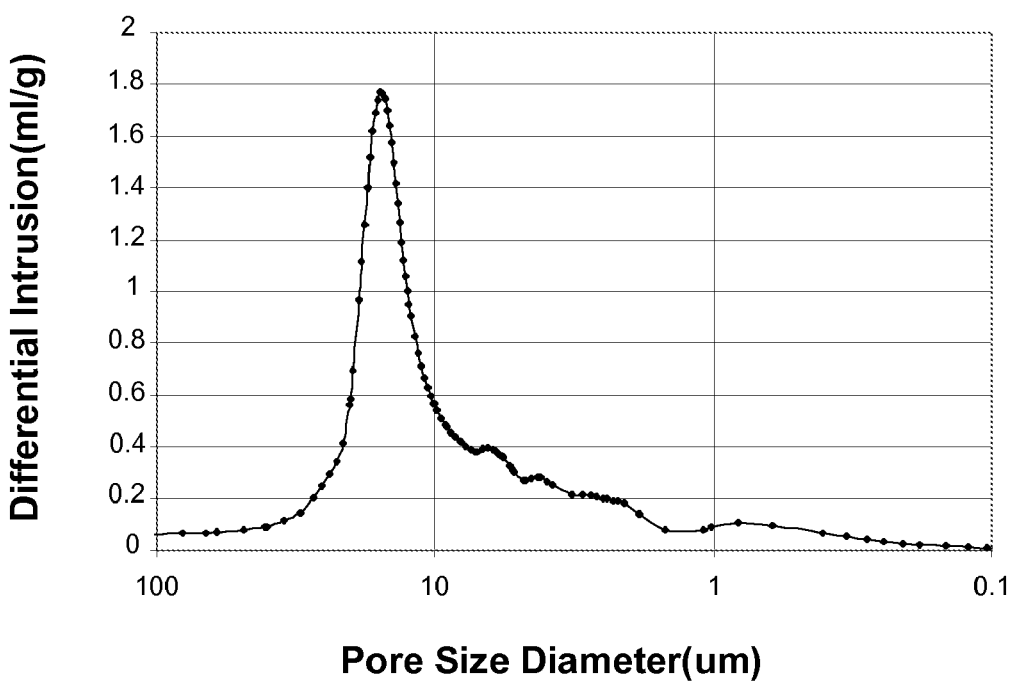
FIG. 4 is a graphic illustration of the pore size distribution (log differential intrusion of ml/g vs. pore size in units of microns) for a zeolite/cordierite body formed from a batch with 50% potato starch superaddition.
Figure 5:
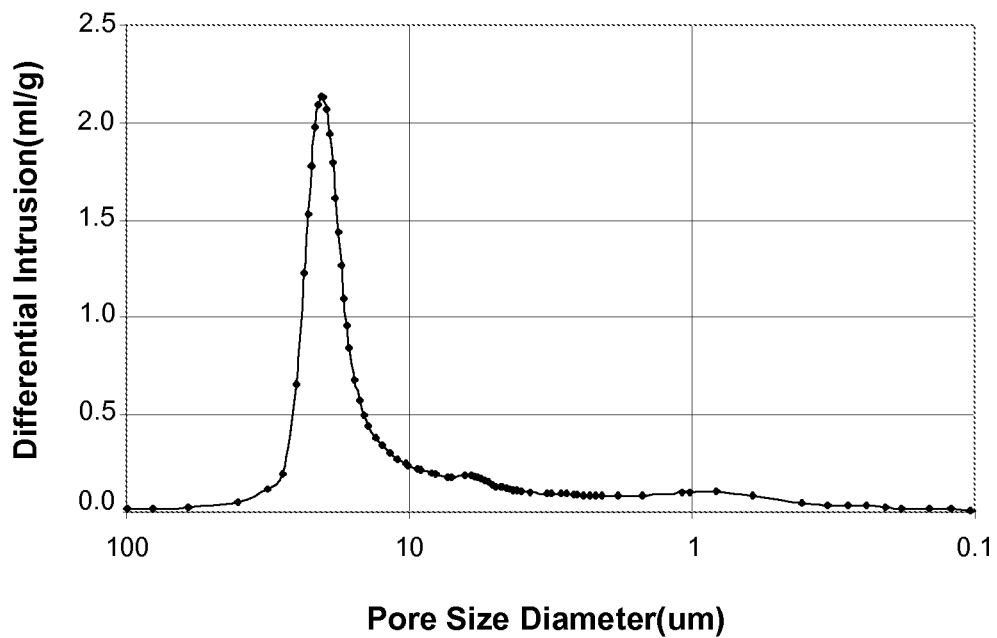
FIG. 5 is a graphic illustration of the pore size distribution (log differential intrusion of ml/g vs. pore size in units of microns) for a zeolite/cordierite body formed from a batch with 50% potato starch superaddition.

FIGS. 1-5 respectively depict log differential intrusion versus pore size for the fired bodies from extrusion batches 1-5. FIGS. 1 and 2 exhibit bi-modal pore distributions, while FIGS. 3-5 exhibit mono-modal distributions. Each of FIGS. 1-5 depict narrow pore distributions that indicates selective pore distributions may be achieved.

EXAMPLE 3

Evaluation of Coefficient of Thermal Expansion

Further zeolite-based bodies were prepared to test thermal expansion characteristics. The extrusion batch formulations are presented in Table 5 below. Porosity data was determined as noted above. Mean coefficients of thermal expansion (CTE) from 25° to 800° C. (expressed in units of ° C.$^{-1}$) were measured using a dilatometer. Values are provided in mass percentages based on the total mass of the batch composition. More or less water may be added as necessary for extrusion rheology control. Honeycomb bodies were extruded from the batches, the bodies were dried, then fired at approximately 850° C. for three hours.

TABLE 5

| | Batch | | | |
|---|---|---|---|---|
| | 6 | 7 | 8 | 9 |
| Zeolite (ZSM-5) | 59.9% | 45.3% | 34.5% | 26.0% |
| Alumina | — | 18.5% | — | — |
| Cordierite | — | — | — | 37.4% |
| Zircon | — | — | 33.1% | — |
| Silicone resin emulsion | 36.1% | 32.5% | 29.1% | 32.9% |
| Methylcellulose | 4.0% | 3.7% | 3.3% | 3.7% |
| Fired Body Composition | | | | |
| Zeolite | 79.8% | 58.5% | 43.2% | 33.7% |
| Alumina | — | 23.9% | — | — |
| Cordierite | — | — | — | 48.4% |
| Zircon | — | — | 41.5% | — |
| Silica binder | 20.2% | 17.6% | 15.3% | 17.9% |
| Porosity (Hg-intrusion) | | | | |
| Porosity (%) | 37.4 | 36.7 | 36.3 | 38.0 |
| Median pore diameter, $d_{50}$ (microns) | 0.7 | 0.6 | 0.6 | 0.9 |
| $d_{10}$ | 0.42 | 0.08 | 0.33 | 0.28 |
| $d_{90}$ | 0.97 | 0.83 | 0.80 | 1.18 |
| $d_F$ | 0.39 | 0.78 | 0.08 | 0.27 |
| $d_B$ | 0.77 | 2.05 | 1.30 | 2.37 |
| Porosity over 5 microns | 1% | N/A | N/A | N/A |

In some embodiments, $d_{50}$ is at least 0.5 micron; in other embodiments, $d_{50}$ is at least 1 micron; in other embodiments, $d_{50}$ is at least 3 microns; in other embodiments, $d_{50}$ is at least 10 microns. In some embodiments, $d_{50}$ is between 0.5 and 25 microns. In some embodiments, $d_{50}$ is between 0.5 and 5 microns; in some of these embodiments, the honeycomb body is a flow through substrate. In some embodiments, $d_{50}$ is between 5 and 25 microns; in some of these embodiments, the honeycomb body is a wall flow filter, such as a particulate filter, for example a diesel particulate filter. In some embodiments, $d_{10}$ is less than 2.0 microns; in other embodiments, $d_{10}$ is less than 1.5 microns; in other embodiments, $d_{10}$ is less than 1.0 microns; in other embodiments, $d_{10}$ is less than 0.5 microns; in other embodiments, $d_{10}$ is less than 0.1 microns. In some embodiments, porosity is greater than 45%; in other embodiments, porosity is greater than 50%; in other embodiments, porosity is greater than 60%. In some embodiments, the honeycomb body is a wall flow filter, such as a particulate filter, having (a) a porosity greater than 40%, (b) $d_{50}$ less than 25 microns (and in some of these embodiments between 10 and 25 microns), (c) $d_F$ not more than 1.0 micron, (d) $d_B$ less than 3.0 microns, or (e) $d_{90}$ not more than 50 microns, and preferably a combination of at least two of (a)-(e), more preferably a combination of at least three of (a)-(e), even more preferably a combination of at least four of (a)-(e), and still more preferably all five of (a)-(e). In some embodiments, the honeycomb body is a flow through substrate having a porosity between 25 and 40%, and $d_{50}$ between 0.5 and 3 microns.

Figure 6:
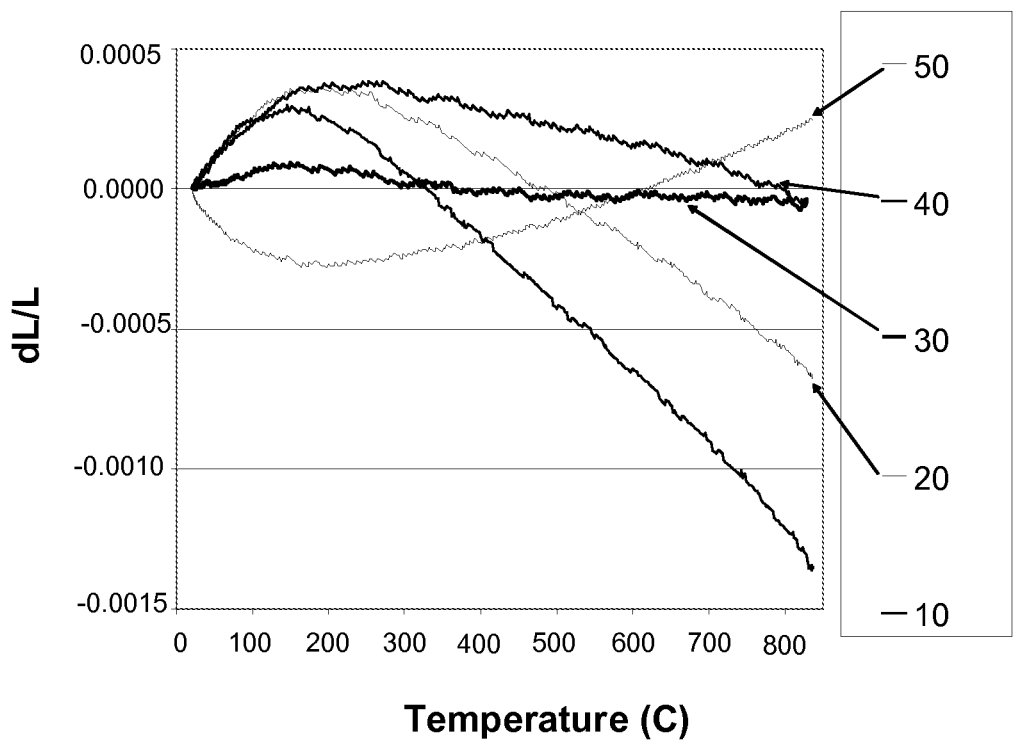
FIG. 6 is a graphic comparison illustration of thermal expansion over a range of 25-800° C. of exemplary zeolite-based bodies and a commercial cordierite body.

Referring now to FIG. 6 therein illustrated is a comparison plot of the thermal expansion over the temperature range of approximately 25-800° C. of the honeycomb bodies of Table 5 (zeolite 10, zeolite alumina 20, zeolite cordierite 30, zeolite zircon 40) with the thermal expansion of a commercially available ground cordierite material 50. The mean coefficients of thermal expansion (CTE) from 25° to 800° C. for the bodies fired from Batches 6, 7, 8, and 9 were $-16.0 \times 10^{-7}$ ° C.$^{-1}$, $-7.5 \times 10^{-7}$ ° C.$^{-1}$, $0.0 \times 10^{-7}$ ° C.$^{-1}$, and $-1.0 \times 10^{-7}$ ° C.$^{-1}$, respectively, and the $CTE_{25-800°\ C.}$ for the commercially available cordierite material was $-2.6 \times 10^{-7}$ ° C.$^{-1}$. As is illustrated, the addition of the secondary phase materials improves the overall thermal expansion characteristics of the zeolite bodies. Notably, the zeolite/cordierite body exhibits almost no hysteresis. In some embodiments, the magnitude of the coefficient of thermal expansion is less than $16 \times 10^{-7}$° $C.^{-1}$, and even less than $12 \times 10^{-7}$° $C.^{-1}$, and even less than $10 \times 10^{-7}$° $C.^{-1}$ for all temperatures between room temperature and about 800° C.; for example, the maximum magnitude of the coefficient of thermal expansion the honeycomb body formed from Batch 9 is $8 \times 10^{-7}$° $C.^{-1}$ for all temperatures between room temperature and about 800° C.

In some embodiments, the zeolite based honeycomb body is washcoated with a catalyst material.

It will be apparent to those skilled in the art that various modifications and variations can be made to the present disclosure without departing from the spirit and scope of the invention. Thus it is intended that the present invention cover the modifications and variations of this disclosure provided they come within the scope of the appended claims and their equivalents.

What is claimed is:

1. A method of making a zeolite-based honeycomb body, the method comprising:
    forming a mixture comprising a zeolite having a $SiO_2$ to $Al_2O_3$ molar ratio in the range from 5 to 300; a secondary phase material having a coefficient of thermal expansion greater than $10 \times 10^{-7}$/° C.; a permanent binder; and 1-80% superaddition of a poreformer agent;
    extruding the mixture to form a cellular body having a matrix of walls; and
    heating the cellular body to produce a zeolite-based honeycomb body;
    wherein the zeolite, secondary phase material and binder are first mixed to form a slurry and the slurry is spray-dried to form zeolite-based agglomerates.

2. The method of claim 1, wherein the walls exhibit a porosity of at least 25% and a median pore diameter of at least 1 micron.

3. The method of claim 1, wherein the zeolite is selected from the group consisting of ZSM-5, beta-zeolites, mordenite, Y-zeolites, ultrastabilized Y-zeolites, aluminum phosphate zeolites and mixtures thereof having a mean particle size of at least 10 microns.

4. The method of claim 1, wherein the poreformer is present in the mixture as a 10-60% superaddition.

5. The method of claim 1, wherein the permanent binder is derived from silicone resin or colloidal material selected from silica, alumina, cordierite, ceria, zirconia and mixtures thereof.

6. A method of making a zeolite-based honeycomb body, the method comprising the steps of:
    forming a slurry mixture comprising a zeolite material;
    spray-drying the slurry mixture to form zeolite-based agglomerates;
    forming a batch formulation comprising the zeolite-based agglomerates, a binder and a poreformer agent;
    extruding the batch formulation to form a honeycomb body having a matrix of walls having the zeolite material homogenously distributed therein; and
    heating the honeycomb body to remove the poreformer agent to produce a median pore diameter greater than 1 micron and a porosity greater than 25% in the walls.

7. The method of claim 6, wherein zeolite-based agglomerates are calcined prior to incorporation into the batch formulation and the agglomerates have a mean particle size of at least 10 microns.

8. The method of claim 6, wherein the slurry mixture further comprises a secondary phase material and binder.

* * * * *